July 12, 1960  G. A. DULMAGE  2,944,851
BALE LIFTERS
Filed Dec. 11, 1958
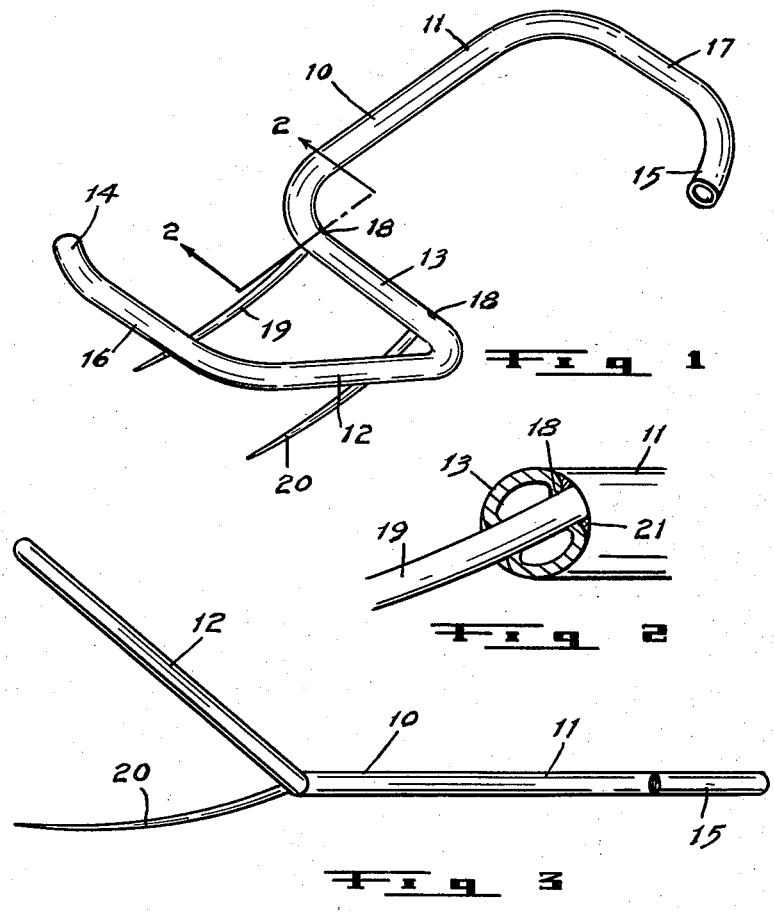
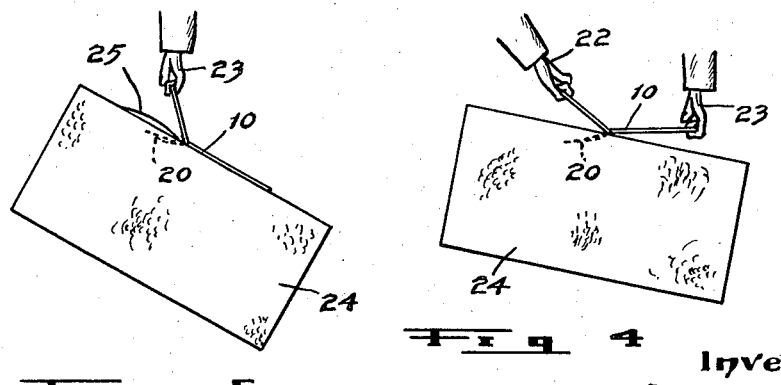
Inventor
George A. Dulmage
By
Walter E. Biggin
AGENT 2,944,851

BALE LIFTERS

George A. Dulmage, Box 505, Yorkton, Saskatchewan, Canada

Filed Dec. 11, 1958, Ser. No. 779,680

2 Claims. (Cl. 294—26)

The present method of treating hay for compact storage and transportation is to pass same through a baling machine which packs the hay into tightly bound blocks, known as bales. Accordingly, the hay can be stored in a minimum of space, or quickly shipped without fear of spilling, and it is readily available by simply breaking the bindings.

The disadvantage of the method is that the bales are cumbersome to handle and hard to grasp, although comparatively light. The operator usually lifts the bales by grasping the bindings, as same are too big to be encircled by his arms. If bare hands are used, they are soon scratched and torn by the rough material, while if gloves are employed it is difficult to work the fingers under the tight bindings, and the said rough material soon wears the gloves out. The result is that a lot of valuable time is lost.

The principal objects of the present invention are: to provide a hand operated bale lifting tool; for holding with both hands; operable to instantly connect with a bale; to manually lift or throw same where desired; with comparative ease and under full control of the operator; without the hands coming into contact with the bale or the bindings; and so protect said hands and eliminate the use of gloves.

A further object of the invention is to construct the tool such, that it can be employed to hold the bale firmly and in a position whereby the operator can carry both the tool and the bale with one hand.

A further object of the invention is to design the tool such, that it can be advantageously used as above described by both right and left handed operators, and with equal results.

Still further objects of the invention are: to construct the bale lifter in a very simple, efficient, economical and durable manner; for light weight operation; ease of manufacture; reasonable retail price; years of satisfactory service; designed so it can be hung on an out of the way hook; and will occupy a minimum of space, especially when stacked, in storage or shipping.

With the above important objects in view, the invention consists essentially in the design, construction and arrangement of the parts hereinafter more particularly described, reference being had to the accompanying drawings in which:

Figure 1 is a perspective view of the bale lifter.

Figure 2 is an enlarged vertical section taken on the line 2—2, Figure 1.

Figure 3 is a side view of the bale lifter.

Figures 4 and 5 are views showing how a bale can be lifted.

In the drawings like characters of reference indicate corresponding parts in the several figures.

Generally speaking, the frame of the bale lifter comprises a relatively light tubing 10 bent in the shape of an S, with one half 11 of the S in a plane approximately at a 45° angle from the plane of the other half 12, while the central cross member 13 is in the plane of both.

The extreme ends of the tubing 10 are partially curved inwardly, as at 14 and 15, so that the end cross members 16 and 17 can each be manually grasped by a hand without danger of slipping off.

A pair of spaced holes 18 are provided through the central cross member 13, one at each end thereof and at a slight downward angle from the plane of the half 11 of the S above mentioned. By observing Figure 2 it will be noted that the holes are punched inwardly so that the material is partially pushed therein, and forms a reinforcement thereto.

A pair of pointed, curved, tapered tines 19 and 20 are each pushed through one of the holes 18 so that their pointed ends are below the cross member 16, form an acute angle with the plane of the half 12 above mentioned, while they form a kind of dipped extension of the half 11 of the S also above mentioned. The thick ends of the tines are brought flush with the rear curved surface of the central cross member 13, and then welded thereto, the welding filling the circular hollow caused by the pressed-in material, as shown at 21.

From the above disclosure it will be seen that a right hand operator can grasp the end cross member 16 of the bale lifter with his left hand 22, and the end cross member 17 with his right hand 23 (see Figure 4). He can then swing the tool in a low arc with ease. Or, a left hand operator can grasp the member 16 with his right hand and the member 17 with his left hand for the same tool swinging purpose.

By so swinging the tool in the correct direction, and slightly downward at the same time, the operator can cause the tines 19 to pierce and enter a bale of hay, indicated at 24 in Figure 4 and without touching the bale with his hands. By continuing the swing, and lifting up on the tool, he can lift the bale in a sweeping curve, and by suddenly stopping the swing of the tool, the bale, due to its momentum, will slide off the tines and be thrown where desired, over the operator's head if necessary. This operation of first pushing the tines into the bale and then lifting the bale in a curved arc and a throwing action can be kept up for a long time, and with comparative ease, by a proficient operator, and it is a big advance over the old method of grasping the binding with bare fingers. It will also be obvious that many more bales can be handled in the same time with a minimum of effort and no damage to fingers or wear and tear on gloves.

If it is necessary to carry a bale, the tines are inserted a little farther therealong. The end cross member 17 is permitted to drop down thereagainst (see Figure 5). One hand can then grasp the end cross member 16 for a single support. It will be noted that the bale then swings to a little sharper angle while the tines may press some of the material thereup a bit, as indicated at 25.

While the tool has been designed specifically for use with hay bales it will be appreciated that it could also be very helpful in moving other types of bales, such as straw and cotton and various other material grown on the land. It might also be very valuable for moving various kinds of light but awkward merchandise, where insertion of the prongs would not be a detriment. By observing the drawings it will also be seen that such tools will readily nest together in stacked arrangement for compact storage and shipping.

What I claim as my invention is:

1. A bale lifter, comprising: a one-piece S-shaped frame presenting three relatively parallel spaced cross members; each outer cross member forming a lateral handle and having one end thereof connected to one of the ends of the central cross member, for support of same; approximately one-half of said frame, which includes said central cross member, an outer cross member and the connection therebetween, positioned in a plane at an obtuse angle to the plane of the opposite approximate half of said frame; and a pair of spaced parallel piercing tines carried by said central cross member, and projecting from said frame, on the side remote from said obtuse angle, to a spaced location from one of said outer cross members.

2. As a new article of manufacture: a bale lifter formed from a single length of tubing bent into a substantial S-shape-form to provide parallel transverse hand gripping outer handles and a central cross member positioned in spaced relation between and parallel to the said handles; one-half of said lifter, from said central cross member and including one of said outer handles, positioned in a plane at an obtuse angle to the plane of the opposite half of said lifter; the extreme ends of each of said handles inwardly turned in a stop; and a plurality of spaced parallel fork-like piercing tines permanently secured to said central cross member and curving away therefrom, on the side remote from said obtuse angle, in a direction toward one of the handles, and terminating a pre-selected distance therefrom.

References Cited in the file of this patent

UNITED STATES PATENTS

| | | |
|---|---|---|
| 2,575,794 | Chauncey | Nov. 20, 1951 |
| 2,583,091 | Dotterer | Jan. 22, 1952 |